Oct. 8, 1968 D. L. COX ET AL 3,404,488
METHOD FOR BLOCKING AND DEBLOCKING LENSES
Filed Aug. 9, 1965
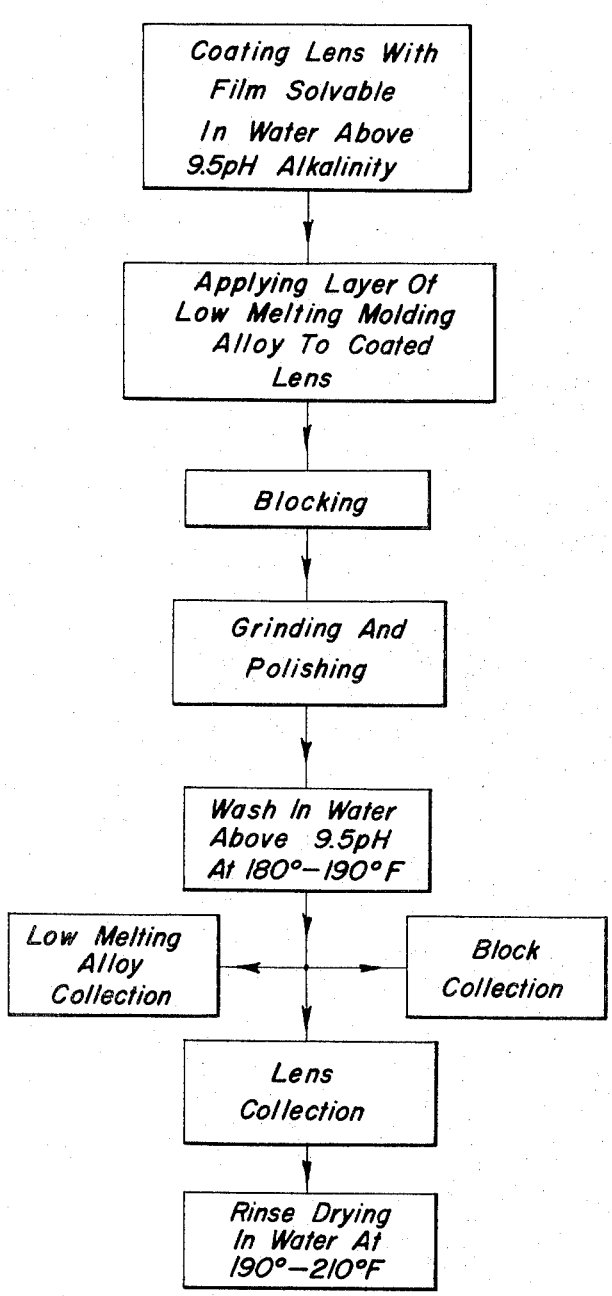
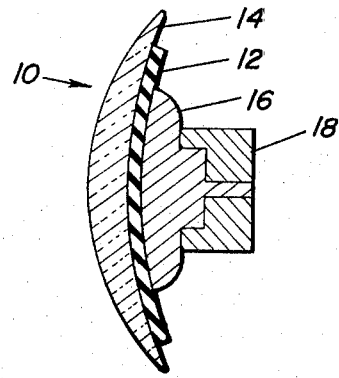
Douglas L. Cox
James E. Savoie
INVENTORS
BY Clarence A. O'Brien
and Harvey B. Jacobson
Attorneys

United States Patent Office 3,404,488
Patented Oct. 8, 1968

3,404,488
METHOD FOR BLOCKING AND DEBLOCKING LENSES
Douglas L. Cox, Irving, and James E. Savoie, Dallas, Tex., assignors, by mesne assignments, to Textron Inc., Rochester, N.Y., a corporation of Delaware
Filed Aug. 9, 1965, Ser. No. 478,191
5 Claims. (Cl. 51—284)

ABSTRACT OF THE DISCLOSURE

A method of blocking and deblocking a lens blank preparatory to generating a surface thereon. The surface of the lens blank opposite that to be worked upon is coated with a resinous film which is substantially insoluble in a coolant medium applied to the lens blank while a surface is being generated thereon. The lens blank is then releasably secured to a mounting block by a low melting point fusible alloy interposed between the mounting block and the resinous film. Subsequent to generation of the desired surface on the exposed side of the lens blank, the resinous film-fusible alloy block-mounted lens is washed in a solution of a surface active agent capable of solvating the resinous film, which solution is simultaneously maintained at a sufficiently high temperature to melt the fusible alloy thereby releasing the lens from the block. The resinous film and the fusible alloy are substantially immiscible thus readily permitting separate recovery of the lens, block, resinous substance and fusible alloy.

---

This invention relates generally to a method of mounting and demounting an article to be worked upon and more particularly to a method and means of blocking or mounting and deblocking an optical article such as a lens which is to be worked upon in an apparatus utilized to generate a surface on the blocked article.

Various methods and means have been proposed heretofore to mount individual lenses in a blocking tool which can be detachably connected to a spindle of an abrading machine in order to generate, grind and polish a surface on the lens. Conventionally, the procedures utilized heretofore have utilized a blocking pitch or wax which was somewhat less than satisfactory due to the fact that when such a pitch displayed sufficient adhesion to retain the lenses on the block during abrading of the lenses it was difficult if not impossible to remove the finished lens from the block without damaging the lens due to the strength of the bond provided by the pitch. On the other hand, attempts to lessen the tenacity of the pitch generally resulted in a substantial number of the lenses parting from the blocks during the abrading of the lenses thereby irreparably damaging the lenses.

A need therefore exists for a method and means of blocking and deblocking articles such as optical lenses so as to permit their being worked upon without any significant danger of their inadvertent separation from the block to which they are secured. In addition, the process must provide a relatively simple means of separating the lenses from their mounting blocks at a predetermined step in the processing of the lenses without any damage to the lenses.

It is therefore a primary object of the invention to provide a method and means of blocking and unblocking articles such as optical lenses to permit the lenses to be mounted in an art device in order to permit their being worked upon.

Another object of this invention is to provide a method of blocking and deblocking optical lenses which utilizes a selectively soluble resinous material which is normally insoluble under the conditions generally experienced during the generation of a surface on an optical lens which resinous material may be selectively rendered soluble to deblock the lens from its mounting block as desired.

A further object of this invention is to provide a method and means of blocking and deblocking optical lenses preparatory to an abrading operation thereon which method and means substantially eliminates the breakage of or damage to the lenses normally experienced with many of the blocking methods and means known heretofore.

Still another object of this invention is to provide a method and means of blocking and deblocking optical lenses which utilizes a selectively soluble resinous composition which facilitates the adhering of optical lenses to a low melting point fusible alloy such as is conventionally secured to a mounting block of the type generally utilized to mount optical lenses in a surface generating and polishing apparatus.

Still a further object of this invention is to provide an improved method for blocking and unblocking lenses which facilitates the substantially automatic production of optical lenses.

These together with other objects and advantages which will become subsequently apparent reside in the details of the method as more fully hereinafter described and claimed, reference being had to the accompanying drawings forming a part hereof, and in which:

FIGURE 1 is a flow diagram illustrating the several steps comprising the method of the present invention; and FIGURE 2 is a cross-sectional view illustrating a lens which has been blocked in accordance with the practice of the present invention.

Briefly, in accordance with the practice of this invention an article such as a lens 10, for example, is either entirely or partially coated with a resinous plastic composition 12 as on the surface 14 characterized by a selective solubility wherein the coating is substantially insoluble at the low alkalinity normally encountered during the grinding and polishing of the lens but which coating will be readily soluble in a detergent solution which is utilized to deblock the lens subsequent to the completion of the grinding and polishing thereof.

Additionally, the deblocking of the lenses may be carried out in a detergent solution which is heated to a temperature above the melting point of a fusible alloy 16 used to secure the coated lens to a steel block 18 thereby facilitating the simultaneous but separate recovery of the lens 10, fusible blocking alloy 16 and steel mounting block 18. As will become readily apparent the method of blocking and deblocking lenses comprising the present invention readily lends itself to the substantially automated production of optical articles or the like.

Referring now to the drawings, it may be seen that the method of the present invention includes the step of coating a lens with a solution of a suitable resin suspended or dissolved in a relatively volatile solvent which coating 12 upon drying is selectively and dimensionally stable in an aqueous solution below a pH of approximately 9.5 at a temperature below 180° F. Another and equally important characteristic of the resinous or adhesive coating 12 is that it must have the adhesive properties required to hold the lens to a low melting point fusible alloy 16 such as a lead-bismuth alloy type alloy, which is utilized as an intermediate means of mechanically securing the coated lens blank to a conventional steel block 18 such as is conventionally utilized in conjunction with a lens abrading apparatus.

Subsequent to blocking as described supra, the block 18 with the lens blank 10 secured thereto is placed in a lens grinding and polishing apparatus where the lens blank 10 is operated upon to generate and subsequently grind and polish a surface thereon. Upon completion of the polishing operation the block 18 with the lens 10 secured thereto is subjected to an aqueous solution with a pH of above 9.5 thereby dissolving the resinous coating 12 thus releasing the lens from the block 18 while at the same time substantially precluding the damaging of the lens by virtue of the fact that it is unnecessary to mechanically jar or grippingly engage the lens 10 to remove it from the block 18. In addition, the highly alkaline aqueous solution utilized to deblock the lens 10 is preferably maintained at a temperature slightly in excess of the melting point of the low melting point fusible alloy 16 thereby facilitating the simultaneous but separate recovery of the lens 10, low melting of point fusible alloy 16 and the steel block 18.

Subsequent to the deblocking of the lens 10 in the highly alkaline aqueous solution, which is primarily a detergent solution, the deblocked lens 10 need only be rinsed with relatively hot water to remove any traces of detergent film adhering thereto after which the lens 10 may be air dried.

It will be understood of course that a plurality of blocked lenses may be placed in suitably constructed racks which racks may be introduced into a dishwashing machine of conventional design charged with a suitable detergent solution to effect deblocking of the lenses as described supra. Such racks are preferably designed so that the racks will retain the finished lenses and the blocks therein while permitting the dissolved resinous coating and the molten blocking alloy to drain out therefrom, in which case the dishwasher or the like would be provided with a suitable means for recovery of the molten blocking alloy 16.

It may therefore be appreciated that the practice of the method of the present invention depends greatly upon the ability of the resinous adhesive coating 12 to hold the lens 10 to the blocking alloy 16 during the many cutting and polishing operations, where water and oil base coolants and abrasives are utilized. It will also be appreciated that the water and oil based polishing abrasives are oftentimes somewhat alkaline in nature. The alkalinity, however, rarely achieves a pH of approximately 9.0 and since the solubility of the resinous adhesive coatings set forth hereinafter is above approximately pH 9.5 the coating 12 is not adversely affected until such time as the blocked lens 10 is subjected to the relatively high alkaline solution.

*Example I*

A specific example of the practice of the present invention involves coating a lens blank 10 with a polyvinyl acetate resin such as marketed under the trademark "Vinnac" by Air Reduction Chemical and Carbides Company, a suitable solution of which resin may be prepared by admixing approximately 12 ounces of polyvinyl acetate with one gallon of denatured ethyl alcohol. As indicated supra, the above resin satisfies the parameters established for the resinous coating inasmuch as it is substantially insoluble and dimensionally stable in an aqueous medium below approximately a pH of 9.5 at a temperature below approximately 180° F. and soluble in an aqueous solution above approximately pH 9.5.

A layer of a suitable low melting point fusible alloy 16 is then applied to the resinous coating 12 on the lens 10 which alloy is preferably of a bismuth-lead type alloy such as, for example, a type referred to as Lipowit's alloy which has a melting point of approximately 150° F. (70° C.) and is composed of 50% bismuth, 27% lead, 13% tin and 10% cadmium. As seen in FIGURE 2, a sufficient amount of the alloy 16 is applied to the resinous coating to permit mechanically securing, or blocking of the lens 10 to the machined steel block 18.

The surface generating, grinding and polishing operations are then carried out in a conventional manner being certain, of course, to maintain the temperature below the melting point of the fusible alloy 16 and the pH of the cooling and abrasive medium below approximately 9.5 pH so as to prevent the inadvertent deblocking of the lens.

Upon completion of the polishing operation the blocked lens is then placed in a suitable rack as described supra which rack may then be immersed in an aqueous detergent solution having a pH in excess of approximately 9.5 at a temperature of approximately 180° to 190° F. thereby dissolving the selectively soluble resinous coating 12 and simultaneously melting the low melting point fusible blocking alloy 16 thus enabling the simultaneous but separate recovery of the lens 10, block 18 and blocking alloy 16.

A suitable detergent to be utilized in the practice of the present invention comprises, on the basis of weight, one part of an admixture of 40% sodium hydroxide, 30% sodium carbonate, 25% sodium hexametaphosphate and 5% of a non-ionic detergent such as a detergent marketed under the trademark of "Pluronic" by the Wyanodotte Chemicals Corporation and one part of an admixture of one gallon monoethanolamine and one gallon of water. The monoethanolamine is used to keep the pH of the solution at approximately 10 or above while at the same time allowing a better free rinsing of the lens than would be possible if the pH was kept high by a greater concentration of sodium hydroxide, or sodium hexametaphosphate which would normally leave a soapy film on the lens.

The final step in the practice of this invention involves the rinsing of the lenses with clear water at approximately 190° to 210° F. after which the lenses are permitted to air dry.

The utilization of the method comprising the present invention in the mass production of lenses has substantially reduced the losses due to the slippage on or release of the lenses from the blocks during the surface generating, grinding and polishing operations performed thereon.

*Example II*

The method of Example I was followed with the exception that the resinous adhesive coating was formed from a composition comprising 12 ounces polyvinyl acetate (Vinnac), one ounce polyvinyl pyrrolidone resin (P.V.P.) marketed by General Aniline and Film Corporation, and one gallon denatured ethyl alcohol.

*Example III*

The method of Example I was repeated with the exception that the resinous coating was formed from a composition comprising ten ounces polyvinyl acetate (Vinnac), two ounces nitrocellulose resin (RS or SS) marketed by Hercules Powder Company, two quarts denatured ethyl alcohol, three pints acetone, and one pint N-butyl acetate.

*Example IV*

The method of Example I was repeated with the exception that the resinous coating was formed from a composition comprising six ounces polyvinyl acetate (Vinnac), six ounces nitrocellulose resin (RS or SS) Hercules Products Company, two quarts denatured alcohol, three pints acetone, and one pint N-butyl acetate.

The addition of approximately one percent by weight of a high molecular weight amine such as dehydroabietylamine such as marketed under the name of Resin B by the Hercules Powder Company may be included in the resinous compositions as set forth supra to improve the resistance of the resinous coating to highly alkaline cooling and grinding mediums. In addition, a low molecular weight acrylic resin such as marketed under the trademark of "Carboset 514" by the B. F. Goodrich Chemical Company may be substituted for the polyvinyl acetate or the polyvinyl pyrrolidone.

The proportions of the various resins set forth supra are not critical and may be varied by as much as approximately 25% without seriously altering the desired holding characteristics of the resinous coating. The volatile solvent for the coating may also, where applicable, be ethylene dichloride, acetone, dioxane, ethyl acetate ethylene glycol, methyl alcohol, isopropyl alcohol, methylethyl ketone, and toluene.

The foregoing is considered as illustrative only of the principles of the invention. Further, since numerous modifications and changes will readily occur to those skilled in the art, it is not desired to limit the invention to the exact method shown and described, and accordingly all suitable modifications and equivalents may be resorted to, falling within the scope of the invention as claimed.

What is claimed as new is as follows:

1. In a method of blocking and deblocking an optical article to be worked upon the improvement comprising the steps of:
   (a) applying a layer of a selectively soluble adhesive to a surface of the article to be worked upon, which adhesive is generally insoluble at a pH and temperature normally encountered in a cooling and cutting medium to be utilized during working of the optical article;
   (b) securing the article to a mounting block with a relatively low melting point fusible alloy contiguous with said selectively soluble adhesive, said fusible alloy being generally insoluble at temperatures normally encountered during the working of said optical article;
   (c) washing the blocked optical article in a medium of a pH and temperature above that normally encountered during working of said optical article thereby effectively deblocking said optical article from said mounting block.

2. A method of blocking and deblocking an article to be worked upon comprising the steps of:
   (a) coating at least one surface of an article to be blocked with an adhering selectively soluble resinous film which is generally insoluble at a pH and temperature normally encountered in a cooling and cutting medium to be utilized during the working of said article;
   (b) applying a layer of a low melting point fusible alloy to the resinous film on said article, said fusible alloy being generally non-fusible at the pH and temperature of a cooling and cutting medium to be utilized during the working of said article;
   (c) securing said alloy to a conventional mounting block adapted to be mounted in a surface generating apparatus; and
   (d) washing the blocked article in a solvent solution of a pH capable of solvating said resinous film, said solvent solution being at a sufficient temperature to simultaneously melt said fusible alloy thereby effectively deblocking the article.

3. The method of claim 2 including the step of:
   separately recovering the article, molten fusible alloy, and said mounting block.

4. A method of blocking and deblocking an optical article to be worked upon comprising the steps of:
   (a) coating at least one surface of an optical article to be blocked with a resinous film which is generally insoluble in an aqueous cooling and cutting medium normally at a pH below approximately 9.5;
   (b) applying a layer of a low melting point fusible alloy to the resinous film on said optical article, said fusible alloy being generally non-fusible at the temperature the cooling and cutting medium is normally maintained;
   (c) securing said alloy to a mounting block adapted to be mounted in a surface generating apparatus;
   (d) generating a desired surface by grinding and polishing the blocked optical article;
   (e) washing the blocked optical article in a solution of a surface active agent having a pH in excess of approximately 9.5 to dissolve the resinous film, said solution being at a sufficiently high temperature to simultaneously melt the fusible alloy thereby releasing the optical article from said block; and
   (f) separately recovering the optical article, molten fusible alloy and said block.

5. The method of claim 4 including the step of:
   rinsing said unblocked optical article in a suitable solvent for the solution of the surface active agent and drying the unblocked optical article.

References Cited

UNITED STATES PATENTS

| | | | |
|---|---|---|---|
| 1,911,153 | 5/1933 | Hill | 51—277 X |
| 2,151,233 | 3/1939 | Rowe | 51—284 X |
| 2,450,433 | 10/1948 | Leeman | 51—284 |
| 3,192,676 | 7/1965 | Buckminster | 51—277 X |
| 3,221,378 | 12/1965 | Faas et al. | 51—284 X |
| 3,226,887 | 1/1966 | Rudd et al. | 51—277 |

LESTER M. SWINGLE, *Primary Examiner.*